3,432,498
ISOMERIZATION OF ACETYLENIC COMPOUNDS
TO CONJUGATED DIOLEFINS
Abraham N. Kurtz, Charleston, W. Va., and Henry F. Hamil, Portland, Tex., assignors to Union Carbide Corporation, a corporation of New York
No Drawing. Filed July 19, 1965, Ser. No. 473,158
U.S. Cl. 260—247  2 Claims
Int. Cl. C07c 11/22; C07d 87/26

ABSTRACT OF THE DISCLOSURE

Acetylenic compounds containing the

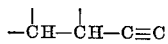

grouping are isomerized to conjugated diolefins by a liquid phase reaction employing an alkali metal, an alkali metal hydride, an alkali metal hydrocarbon, an alkali metal hydroxide or an alkali metal alcoholate as a catalyst and an organic sulfoxide or an N,N-disubstituted amide as a reaction solvent.

---

This invention relates to an improved method for isomerizating acetylenic compounds. More particularly, this invention is concerned with an improved process for converting acetylenic compounds containing at least 4 carbon atoms in an aliphatic acetylenically-unsaturated chain to conjugated diolefins. In a still more particular aspect, this invention is concerned with a method for the isomerization of a 2-amino-3-butyne compound to a 2-amino-1,3-butadiene compound, hereinafter referred to as an "aminoprene."

Although it has been known that acetylenic compounds can be isomerized to form conjugated dienes, no process has been found which is generally applicable to a wide variety of acetylenes. For example, R. A. Raphael, in "Acetylenic Compounds in Organic Synthesis," Butterworths, London (1955), at pages 115–6 and 134–7, has disclosed that butynes containing electron-withdrawing substituents, for example, aryl or carboxyl groups, can be isomerized in the presence of basic catalysts to conjugated dienes. When the butyne contains an eletcron-donating substituent, however, such as an amino group, these methods fail to produce a conjugated diene. Reppe et al., in U.S. Patent 2,301,971 and German Patent 896,347 have disclosed that N-phenyl-2-amino-3-butynes can be isomerized to N-phenyl-2-amino-1,3-butadienes by heating in the vapor phase, with or without catalysts, at a temperature in excess of 200° C. This method cannot be employed to readily synthesize the more active dienes, for example 2-amino-1,3-butadiene, because many rapidly polymerize at the elevated temperatures required for the isomerization, thereby precluding their recovery in the monomeric form.

It has now been discovered by this invention that a wide variety of conjugated dienes, including aminoprenes, can be synthesized by the liquid-phase isomerization of an acetylenic compound in contact with, as a catalyst, an alkali metal or a compound thereof and, as a reaction solvent, a sulfone or an N,N-disubstituted amide.

The acetylenes which are isomerized in accordance with this invention are those containing at least 4 carbon atoms in an aliphatic chain having no unsaturation except one acetylenic triple bond and having at least one hydrogen atom on each of the carbons alpha and beta to the acetylenic triple bond; that is, 3,4-dihydro-1-butynes containing the

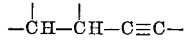

grouping. These compounds can be broadly represented by the formula:

(I) 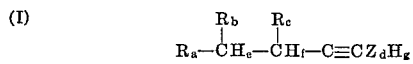

wherein $a$, $b$, $c$ and $d$ each are integers having a value of from 0 to 1, inclusive; $e$ is an integer having a value of $3-a-b$; $f$ is an integer having a value $2-c$; $g$ is an integer having a value of $1-d$; and each R and Z is an organic substituent. By the term "organic" substituent, as employed herein, is meant any substituent capable of being bonded to an organic compound, and includes hydrocarbon substituents, such as alkyl, alkenyl, alkynyl, cycloalkyl, aryl, aralkyl, alkaryl and the like; oxygen-containing substituents, such as substituents containing carboxyl and carbonyl groups, and ether and ester linkages; nitrogen-containing substituents, such as substituents containing primary, secondary or tertiary amino groups, and amide groups, et cetera. Moreover, two different R's may be taken together to form a carbocyclic or heterocyclic ring of 5 to 6 ring atoms. Substituents containing a halogen or an active, i.e., acidic, hydrogen as determined by the Zerewitinoff method, such as hydroxyl groups or N-unsubstituted amide groups, are undesirable because they react with the alkali metal or compound thereof employed as catalyst. Preferred butynes are those having molecular weights of less than about 300.

The process of this invention is of particular applicability in producing aminoprenes by the isomerization of aminobutynes of the formula:

(II) 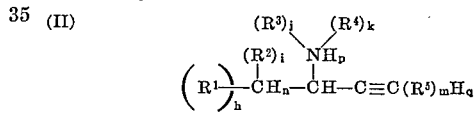

wherein each $h$, $i$, $j$, $k$ and $m$ is an integer having a value of from 0 to 1, inclusive; $n$ is an integer having a value of $3-h-i$; $p$ is an integer having a value of $2-j-k$; $q$ is an integer having a value of $1-m$; each $R^1$, $R^2$, $R^3$, $R^4$ and $R^5$ is a monovalent radical consisting of no atoms other than carbon, hydrogen and oxygen, with the oxygen being present solely in the form of an ether linkage, such as alkyl, alkenyl, alkynyl, cycloalkyl, aryl, aralkyl, alkaryl, alkoxy, aryloxy, alkoxyaryl, aryloxyaryl and the like; and each $R^1$ and $R^2$, when taken together, and $R^3$ and $R^4$, when taken together, form a divalent radical consisting of no atoms other than carbon, hydrogen and oxygen in the form of an ether linkage, for example a polymethylene chain or a —CH$_2$CH$_2$OCH$_2$CH$_2$— chain.

Preferred aninobutynes are those wherein each radical is free from non-benzenoid unsaturation, contains no more than 18 carbons and one ether oxygen and wherein the divalent radical represented by $R^1$ and $R^2$, when taken with the carbon atom of the butyne group, forms a ring of from 5 to 6 ring members, and the divalent radical represented by $R^3$ and $R^4$, when taken with the nitrogen atom, forms a heterocyclic ring of from 5 to 6 ring members. Especially preferred aminobutynes are those having molecular weights of less than 300.

Compounds illustrative of this class include 3-amino-1-butyne, N-methyl-3-amino-1-butyne, N,N-dimethyl-3-amino-1-butyne, N-decyl-3-amino-1-butyne, N,N-didecyl-3-amino-1-butyne, N-phenyl-3-amino-1-butyne, N-methyl-N-phenyl-3-amino-1-butyne, 1-phenyl-3-amino-1-butyne, 3-amino-4-phenyl-1-butyne, N-cyclopentyl-3-amino-1-butyne, 1-cyclopentyl-3-amino-1-butyne, 3-morpholino-1-butyne, 1-cyclopentyl-1-amino-3-propyne, 3-piperidino-1-butyne, and various aliphatic homologs of the foregoing amines, such as the aminopentynes, aminohexynes, the aminodecynes and the like.

The catalysts employed in accordance with the process of this invention are alkali metals or compounds thereof. Suitable alkali metals include those having atomic numbers of from 3 to 19, i.e., potassium, sodium and lithium. Suitable compounds include alkali metal hydrides; alkali metal hydrocarbons of up to about 10 carbons, including alkyls such as methyl sodium, ethyl sodium, propyl sodium, octyl sodium, benzyl sodium, and the like; alkali metal aryls such as phenyl sodium, tolyl sodium, xylyl sodium, naphthyl sodium and the like, and alkali metal acetylides; alkali metal hydroxides; and alkali metal alcoholates of up to 10 carbons, such as potassium ethoxide, potassium t-butoxide, potassium pentoxide and the like. These catalysts may be represented by the formula:

(III)        $M\{-(O)_r-(R^6)_s-H\}_t$ wherein each $r$, $s$, and $t$ is an integer having a value of from 0 to 1, inclusive; M is an alkali metal as defined above; and $R^6$ is a divalent hydrocarbyl radical, i.e., a radical consisting solely of hydrogen and of from 1 to about 10, preferably 1 to about 6, carbons, including radicals which are saturated or contain olefinic, acetylenic or aromatic unsaturation. Preferred hydrocarbyl radicals are saturated hydrocarbyl radicals with the alkali metal alkoxides being especially preferred.

The catalytic amount of base catalyst is not narrowly critical and can vary from about 1 mole percent or less to about 50 mole percent or higher, based upon the acetylenic compound being isomerized. Amounts of from about 5 to about 20 mole percent are preferred.

The solvents which are employed in accordance with the process of this invention are organic sulfoxides or N,N-disubstituted amides represented by the formula:

(IV)        $R^7-Z-R^8$ wherein $R^7$ and $R^8$, when taken individually, are hydrocarbon radicals free from non-benzenoid unsaturation, i.e., alkyl or aryl radicals, of up to 6 carbons, such as methyl, ethyl, propyl, hexyl, phenyl and the like; and, when taken together, form a divalent polymethylene radical of from 4 to 5 carbons; and Z is a divalent sulfinyl radical $$(-\overset{O}{\underset{\|}{S}}-)$$

or a divalent

radicals wherein $R^9$ is hydrogen or alkyl of from 1 to 5 carbons or, when taken with $R^8$, is a divalent polymethylene radical of from 4 to 5 carbons.

Subgeneric to the compounds of Formula IV are the sulfoxides of the formula:

(V)        $R^{10}-\overset{O}{\underset{\|}{S}}-R^{11}$ wherein each $R^{10}$ and $R^{11}$ are hydrocarbon radicals of up to 6 carbons which are free from non-benzenoid unsaturation; the N,N-dialkylamides of the formula:

(VI) 

wherein each $u$ and $v$ is an integer having a value of from 1 to 3, inclusive; and $w$ is an integer having a value of from 0 to 3, inclusive; and N-acyl heterocyclic amides of the formula:

(VII) 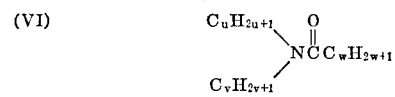

wherein $x$ is an integer having a value of from 0 to 6, inclusive, and $y$ is an integer having a value of from 4 to 5, inclusive; and the N-alkyl heterocyclic amides of the formula:

(VIII) 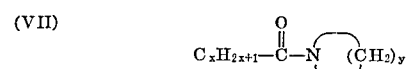

wherein $R^{12}$ is alkyl of from 1 to 5 carbons and $z$ is an integer of from 3 to 5, inclusive.

Illustrative examples of suitable solvents include dimethyl sulfoxide, diphenyl sulfoxide, N,N-dimethylformamide, N,N-dimethylacetamide, N,N-dipropylformamide, N,N-dimethylbutyramide, N-formylpiperidine, N-acetylpiperidine and the like; N-methylpyrrolidone, N-ethylpyrrolidone and the like; et cetera.

The amount of solvent employed is not highly critical to this invention, but should be enough to maintain the reaction system in the liquid phase. In general, the weight ratio of solvent to acetylenic compound can vary from about 0.5:1 to about 100:1 or even more, with ratios of from about 0.9:1 to about 10:1 being preferred.

The remaining reaction conditions are not narrowly critical to this invention. Thus, the reaction temperature can vary from 0° C. or lower to 150° C. or higher, with temperatures of from about room temperature (20–25° C.) to about 100° C. being preferred. Pressure is not critical, and sub- or super-atmospheric pressures can be employed. Normally, however, the isomerization is effected at atmospheric pressure.

The reaction technique is not highly critical and any suitable technique may be employed. For example, a solution of acetylenic compound, catalyst and solvent may be prepared and subjected to the reaction conditions. Alternatively, one might pass vapors of the acetylenic compound through a fixed bed of catalyst which is wetted by the solvent. Still other techniques will occur to those of ordinary skill in the art.

The conjugated diene may be recovered in any convenient manner, such as fractionation, extraction and the like. Because many of these products are highly reactive, it is preferred to recover them in solution in the reaction solvent and at low temperatures, generally below 0° C., to prevent polymerization.

The specific product which is recovered will depend greatly upon the length of the aliphatic chain and the type of substituents present on the chain. For example, an aliphatic chain of more than five carbons will permit migration of the aliphatic unsaturation and, thus, several diene isomers may be produced. An amino group attached to a carbon atom of the aliphatic chain will tend to stabilize the system in a manner such that the carbon atom containing the amino group will also form one of the double bonds of the conjugated diene systems, and an aromatic substituent on the aliphatic chain will tend to stabilize the conjugated diene in a manner such that the aromatic double bond is in a conjugated relationship with one double bond of conjugated dieneic double bond.

The following examples are illustrative:

EXAMPLE 1

To a mixture of 8.21 grams of dimethyl sulfoxide and 1.12 grams of potassium tert-butoxide at 25° C. was added 8.21 grams of 1-hexyne over a 10-minute period. An exothermic reaction occurred, and the system was then heated to 72° C. and held at that temperature for 92 hours. The resulting mixture was stripped at 46° C. and 6.4 mm. Hg to a −80° C. cold trap. The cold trap condensate, which weighed 8.00 grams, was found by vapor phase chromatographic analysis to contain 2.3% 1-ethyl-1,3-butadiene, 52.0% cis, trans-2,4-hexadiene, 34.1% trans,trans-2,4-hexadiene and 10.2% 2-hexyne.

Essentially the same product mixture was recovered from an identical experiment, except that 3-hexyne was substituted for 1-hexyne.

EXAMPLE 2

To a mixture of 5.62 grams of potassium tert-butoxide and 48.6 grams of dimethylsulfoxide at 25° C. was added 48.6 grams of 3-(dimethylamino)-1-butyne. An exothermic reaction occurred, and the temperature rose to 45° C. After holding for three days at room temperature, the reaction product was vacuum distilled at 2 mm. to obtain 41.1 grams of crude 2-(dimethylamino)-1,3-butadiene boiling at −14° C. to 1.3° C. On redistillation at 5.8 mm. there were recovered 34.8 grams of 2-(dimethylamino)-1,3-butadiene boiling at 8.8–14.2° C. On further purification by distillation there were recovered 31 ml. of 2-(dimethylamino)-1,3-butadiene boiling at 6.4–6.8° C. and 7.5 mm. Hg and having a density $d_{25}^{25}$ of 0.7882 and an index of refraction, $n_D^{24}$, of 1.4638.

The assigned structure was confirmed by its nuclear magnetic resonance, infrared and ultraviolet spectra as well as by hydrogenation of the product to give sec-butyl dimethyl amine.

The 2-(dimethylamino)-1,3-butadiene polymerizes slow even at −80° C. but is stable in pyridine solution at 25° C.

EXAMPLE 3

Employing techniques similar to those described in Example 2, 3-(dimethylamino)-1-butyne is converted to 2-(dimethylamino)-1,3-butadiene.

EXAMPLE 4

Employing techniques similar to those described in Example 2, 3-(dimethylamino)-4,4-dimethyl-1-butyne is converted to 3-(dimethylamino)-4,4-dimethyl-1,3-butadiene.

EXAMPLE 5

A mixture of 0.5 gram of 4-methyl-3-morpholino-1-phenyl-1-pentyne, 40 milliliters of dimethylformamide and 0.1 gram of potassium tert-butoxide was stirred at room temperature for 3 hours with the production of 4-methyl-3-morpholino-1-phenyl-1,3-pentadiene. The reaction product was poured into water and extracted with ether. On evaporation of the ether there was recovered 0.42 gram of 2-methyl-5-phenyl-4-penten-3-one, as determined by infrared and nuclear magnetic resonance spectra, the product of the hydrolysis of 4-methyl-3-morpholino-1-phenyl-1,3-pentadiene.

What is claimed is:

1. In the method for the production of a conjugated diene by the isomerization of a 3,4-dihydro-1-butyne, the improvement of effecting said isomerization in the liquid phase in contact with (1) a catalytic amount of an alkali metal alkoxide of from 1 to about 6 carbons of an alkali metal having an atomic number of 3 to 19 inclusive, and (2) as a liquid solvent a sulfoxide of the formula:

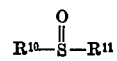

wherein each $R^{10}$ and $R^{11}$ is an alkyl radical or an aryl radical of up to 6 carbons.

2. The process as claimed in claim 1 wherein said alkali metal alkoxide is potassium tert-butoxide and said sulfoxide is dimethyl sulfoxide.

References Cited

UNITED STATES PATENTS 3,213,155  10/1965  Schriesheim et al. ___ 260—683.2
2,301,971  11/1942  Reppe et al. _____ 260—577

ALEX MAZEL, *Primary Examiner.*

J. TOVAR, *Assistant Examiner.*

U.S. Cl. X.R.

260—680, 583, 293